United States Patent [19]
Bertacchi

[11] Patent Number: 6,097,950
[45] Date of Patent: *Aug. 1, 2000

[54] METHOD AND SYSTEM FOR GLOBAL ROAMING IN A CELLULAR TELECOMMUNICATIONS SYSTEM

[75] Inventor: Luciano Bertacchi, Pierrefonds, Canada

[73] Assignee: Telefonaktiebolaget LM Ericsson (publ), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,232

[22] Filed: Dec. 27, 1996

[51] Int. Cl.$^7$ ....................................................... H04Q 7/20
[52] U.S. Cl. ........................ 455/432; 455/433; 455/551; 455/552
[58] Field of Search ..................... 455/403, 422, 455/432, 433, 435, 436, 552, 553, 406, 410, 411, 567, 551, 418, 419

[56] References Cited

U.S. PATENT DOCUMENTS

| | | | |
|---|---|---|---|
| 5,159,625 | 10/1992 | Zicker | 379/59 |
| 5,259,018 | 11/1993 | Grimmett et al. | 455/551 |
| 5,303,286 | 4/1994 | Wiedeman | 379/59 |
| 5,353,331 | 10/1994 | Emery et al. | 379/58 |
| 5,384,824 | 1/1995 | Alvesaio | 379/59 |
| 5,428,666 | 6/1995 | Fyfe et al. | 455/551 |
| 5,428,771 | 6/1995 | Daniels et al. | 395/575 |
| 5,467,381 | 11/1995 | Peltonen et al. | 379/58 |
| 5,590,174 | 12/1996 | Tsuji et al. | 455/553 |
| 5,610,974 | 3/1997 | Lantto | 455/433 |
| 5,659,598 | 8/1997 | Byrne et al. | 455/553 |
| 5,699,408 | 12/1997 | Krolopp et al. | 455/461 |
| 5,745,850 | 4/1998 | Aldermeshian et al. | 455/567 |
| 5,765,105 | 6/1998 | Kuriki | 455/410 |

FOREIGN PATENT DOCUMENTS 2280085A  1/1995  United Kingdom .
WO 96/04759  2/1996  WIPO .

OTHER PUBLICATIONS

Young on Number Portability: A Gathering Storm for Cellular; *Cellular Networking Perspectives*, Jan. 1996, pp. 2–3.

Yi–Bing Lin and Imrich Chlamtac; "Heterogeneous Personal Communications Services: Integration of PCS Systems"; *IEEE Communications Magazine*; Sep., 1996; vol. 34, No. 9; pp. 106–113.

Y. Nodera, M. Ohashi, S. Sakai, T. Suzuki, A. Yamaguchi and T. Mizuno; "Interworking between GSM and PDC through IC Cards"; IEEE Communications —Gateway to Globalization —Proceedings of the Conference on Communications, Seattle; Jun. 18, 1995; vol. 2; pp. 761–765.

*Primary Examiner*—Dwayne D. Bost
*Assistant Examiner*—Nay Maung
*Attorney, Agent, or Firm*—Smith & Danamraj, P.C.

[57] ABSTRACT

A global roaming system and method for allowing a subscriber to roam between first and second cellular telecommunications systems having non-compatible air interfaces where the subscriber has a subscription in the first cellular telecommunications system and has at least one mobile terminal adapted to operate with the non-compatible air interfaces. The global roaming system includes a home location register (HLR) associated with the first cellular telecommunications system for storing a service profile including one directory number for the subscriber that includes fields for storing number pairs comprising a mobile identification number (MIN) and a mobile serial system number (ESN) where each number pair is recognizable by at least one of the first and second cellular telecommunications systems. Signaling links are provided to interconnect the first and second cellular telecommunications systems with the HLR. By including these number pairs in the HLR and the translation device in the signaling links, a mobile terminal is able to obtain a profile for use in a non-compatible system from the mobile terminal's HLR, and the HLR can be updated with the location of that mobile terminal in its non-compatible cellular telecommunications system.

18 Claims, 5 Drawing Sheets

METHOD AND SYSTEM FOR GLOBAL ROAMING IN A CELLULAR TELECOMMUNICATIONS SYSTEM

BACKGROUND OF THE INVENTION

1. Technical Field of the Invention

The present invention relates to a method and system for providing global roaming in a cellular telecommunications system. In particular it relates to a method and system for permitting a subscriber to roam between two cellular systems configured to operate under different air interface standards or protocols.

2. Description of Related Art

There is need to provide a mobile subscriber having a single 10 telephone number and having the ability to provide access to that mobile subscriber no matter in which cellular telecommunications system that subscriber is located anywhere in the world.

While the concept of providing a global telephone number or a global roaming to a mobile terminal has been taught in U.S. Pat. No. 5,303,286 issued Apr. 12, 1994 to Robert A. Wiedeman, this patent teaches a satellite system that provides for global telephone communications. This system is not compatible with cellular telephone communications which have now been developed in various regions throughout the world.

The problem with cellular telecommunications systems operating in different regions and geographical locations is that these cellular telecommunications systems have been developed based on different air interface protocols, cell mapping configurations and user services. For example, in Europe there are common protocols referred to as "GSM" (Global System for Mobile Communications) and TACS (Total Access Communication System). Also, there are interfaces in the United States and Canada which are based on AMPS (Advanced Mobile Phone System) and D-AMPS (Digital-Advanced Mobile Phone System). Further there are standard cellular systems in Japan (Personal Digital Cellular—PDC). All of these systems operate on different air interface protocols where the messaging on the air interface is different and messaging between nodes is different. Currently, there is no system in place that allows a subscriber to have access to different cellular telecommunications systems using one subscription and one telephone number.

It is also known that different cellular service providers of the same standardized air interface protocols may allow subscribers to roam between these different cellular telecommunications service providers. This roaming feature however is for a mobile subscriber who subscribes to one form of cellular telecommunications systems protocol and not for a subscriber wishing to roam in normally non-compatible cellular systems.

A method of global roaming between non-compatible interfaces is disclosed in U.S. Ser. No. 08/530,161 filed Sep. 29, 1995 assigned to the same assignee as the present invention, i.e. Telefonaktiebolaget L M Ericsson, and titled "A method and arrangement relating to telecommunications systems". In this application, there is disclosed the introduction of an international telecommunications system including an international home location register (HLR) and an international mobile switching center (MSC). The international system is connected through appropriate interfaces to a home system and a guest system. In order to be able to register in the guest system it is required that the subscriber is to subscribe to both the international system and the home system. While this system allows for global roaming between non-compatible air interfaces, it introduces an extra management layer to be operated by an "international" operator.

Accordingly, there is a need to provide a global roaming service to a subscriber to allow the subscriber to roam between non-compatible cellular telecommunications systems without the introduction of extra layers of network management.

SUMMARY OF THE INVENTION

The present invention relates to a method and system for providing global roaming between first and second cellular telecommunications systems having non-compatible air interfaces. The system provides for one subscriber directory number to be associated with one or more number pairs comprising a mobile terminal serial system number and a mobile identification number identifiable by at least one of the cellular telecommunications systems. In this manner, the present invention allows for at least one mobile terminal to have access in either of the cellular telecommunications systems and be identifiable in one of the cellular telecommunications systems. Hence a single subscriber directory number is sufficient to identify and access one or more terminals in non-compatible cellular systems.

In accordance with one aspect of the present invention there is provided a global roaming system allowing a subscriber to roam between first and second cellular telecommunications systems having non-compatible air interfaces. The subscriber has a subscription in the first cellular telecommunications system The subscriber may have one mobile terminal adapted to operate with the non-compatible air interfaces or alternatively and more practically at this time, the subscriber may have a mobile terminal for each cellular telecommunications system. The global system includes a home location register (HLR) originally established and operating in the first cellular telecommunications system for storing a service profile associated with a subscriber's directory number (SNB). The service profile includes fields to store for each system at least one mobile identification number (MIN) identifiable by one or both of the first and second cellular telecommunications systems and to store for each system at least one mobile serial system number (ESN) associated and compatible with at least one or both of the first and second cellular telecommunications systems. The global system further includes signaling link means interconnecting the first and second cellular telecommunications systems with the HLR. The global system also includes registration means for each of the first and second telecommunications systems responsive to a registration request from the subscriber to forward over the signaling link means the MIN and ESN corresponding to the cellular telecommunications system in which registration is requested. This information is forwarded over the signaling link means to the HLR associated with the MIN to authenticate that the subscriber is permitted to access the cellular telecommunications system in which registration is requested.

By defining the same or different MIN/ESN number pairs associated in various incompatible cellular systems, and associating these number pairs to the same user profile or subscriber directory number (SNB) stored in the HLR in one of the systems, it is possible to allow a subscriber to operate the same or different mobile terminals with the air interface of the respective systems and still update his HLR with the correct location information for routing purposes. It should be understood that registrations in cellular telecommunications having different protocols are not currently standardized. Accordingly, the HLR receiving a registration request from a subscriber of another cellular telecommunications system would have to be able to identify the MIN/ESN number pair associated with the other system so as to process the registration request. This may require a translation or look up table in the HLR, or in the requesting (registrating) system/node.

In a preferred embodiment of the present invention the signaling link means may include signal conversion means between the second cellular telecommunications system and the HLR to translate non-compatible messages between the HLR and the second telecommunications system Alternatively, the signal conversion means may be located directly in the HLR for making the conversions in the HLR for all communications between the HLR and the second cellular telecommunications system. The signaling link means may comprise common SS7 or CC7 signaling link means for providing data messages to travel between nodes in the system. The purpose of the signal conversion means is to translate differences in protocols between two different systems. This may require translations of system parameters, such as, for example, cellular mapping configurations, MIN strings, service profiles and authentication procedures. To the extent that ESN, MIN and other aspects of the user profile become more standardized between systems having non-compatible air interfaces, it may be possible at that time to operate a system without the use of a signal conversion means.

The HLR may further identify or have a field identifying the associated air interface protocol for each of the MIN/ESN numbers pairs contained in the HLR. Each mobile terminal is reached (called) with the same telephone number (SNB) associated with the first cellular telecommunications system Accordingly, when the SNB is dialed, the HLR is contacted and it provides a routing to the appropriate node to permit for the communication within the first telecommunications system or the second telecommunications system depending on the location where the subscriber has an active mobile terminal.

In accordance with another aspect of the present invention the mobile terminal may include more than one MIN/ESN number pair containing common numbering that identifies the HLR. In such an embodiment it is possible that the mobile terminal may be used each with a MIN and a corresponding ESN which are able to operate within respective interface systems. This would mean that the mobile terminal is able to operate in a corresponding cellular telecommunications system and when registering with that system, the MIN has some of the numbers associated therewith which would allow it to transfer information back to the appropriate HLR to authenticate that user.

Alternatively, it may be possible that the mobile terminal is a dual mode terminal adapted to operate in both air interfaces. Or the mobile terminal, instead of storing the ESN and MIN may include a Smart Card which can be placed into the terminal for that air interface standard. A single Smart Card may be used which works with different types of terminals or a Smart Card for each of the terminals associated with a respective cellular telecommunications system could be used. The Smart Card could contain one or more MIN/ESN number pair to the extent that each of the cellular telecommunications systems can recognize at least one MIN/ESN number pair.

In accordance with another aspect of the present invention, there is provided a global roaming system comprising first and second cellular telecommunications systems having non-compatible air interfaces allowing a subscriber having a subscription with one directory number in the first cellular telecommunications system to roam in the second cellular telecommunications system. Roaming by the subscriber in the second cellular telecommunications system is validated by the first cellular telecommunications system. The system comprises a mobile terminal assigned to said subscriber and adapted to operate in the first and second cellular telecommunications systems with the corresponding non-compatible air interfaces. The mobile terminal is operable to transmit over the non-compatible air interfaces at least a first pair of numbers comprising a mobile identification number (MIN) and a mobile serial system number (ESN) associated with at least the first cellular telecommunications system. The first cellular telecommunications system includes a home location register (HLR) for storing a service profile for said subscriber that identifies the mobile terminal by said one directory number and includes fields for storing said first pair of numbers. The system includes signaling link means interconnecting the first and second cellular telecommunications systems with the HLR. The system further includes first and second registration means corresponding to each of the first and second telecommunications systems responsive to a registration request from the subscriber terminal when located in either system to forward over the signaling link means to the HLR said number pair to authenticate that the subscriber is permitted to access the cellular telecommunications system in which registration is requested.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF EMBODIMENTS

Figure 1:
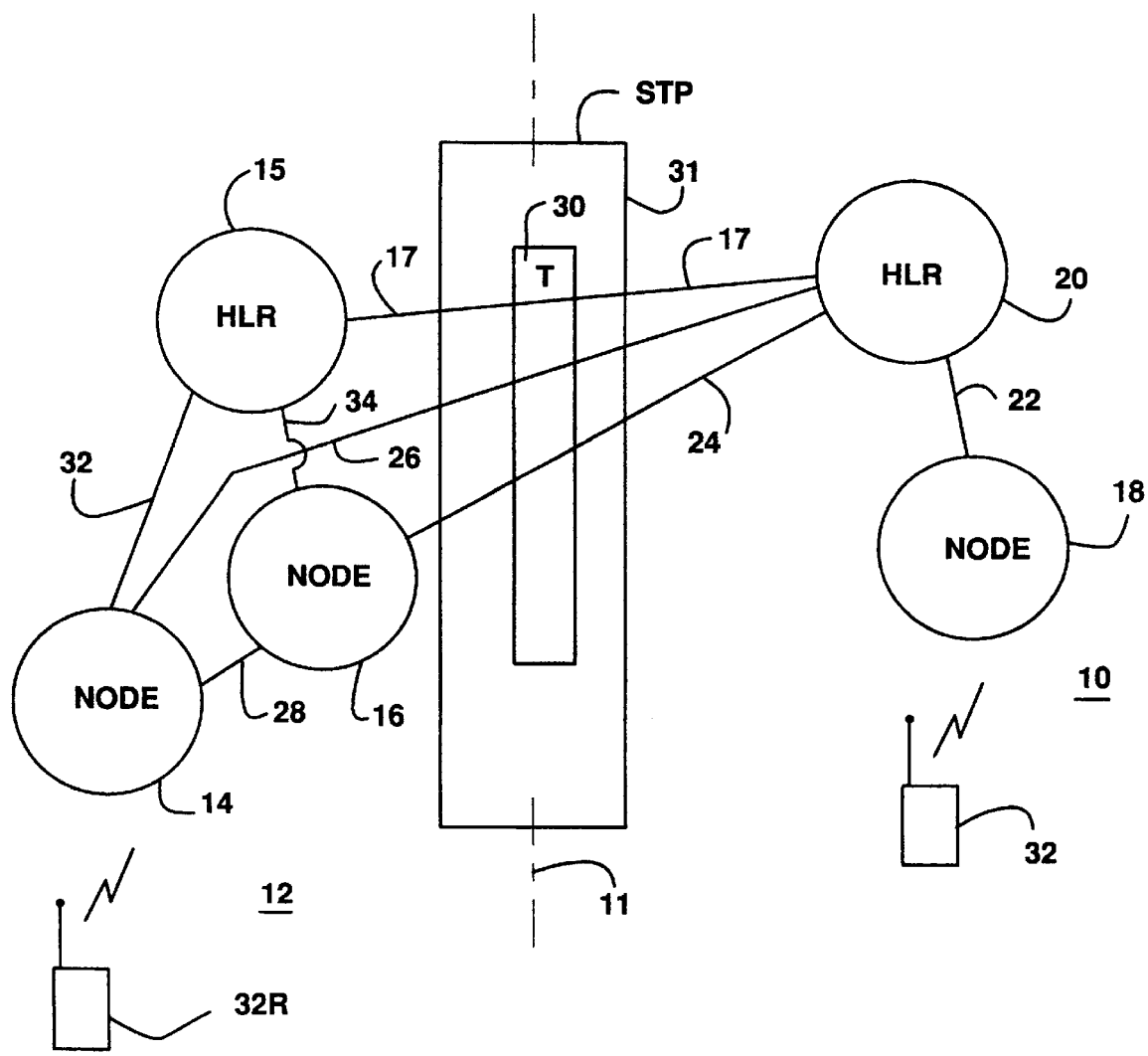
FIG. 1 is a schematic drawing showing the signaling link means between nodes in non-compatible cellular telecommunications systems with a translation device interconnecting the two systems to translate non-compatible messages between the systems in accordance with the present invention.

Referring to FIG. 1 there is shown a schematic drawing of two non-compatible cellular telecommunications systems 10 and 12 with translation device or devices 30 interconnecting the two systems to translate non-compatible messages between the systems, in accordance with the present invention. The first cellular telecommunications system 10 includes a node 18 which comprises a mobile switching center (MSC) 18. The MSC 18 is connected through a signaling link 22 to a second node 20 which in this illustration is a home location register 20 (HLR). The HLR 20 could be located separately from the MSC 18 or could be co-located with the MSC 18. The signaling link 22 could either be a SS7, CC7 or X.25 configured signaling link or other appropriate link. For the purpose of illustrating separate and distinct cellular telecommunications systems, a broken line 11 is shown. It should be understood that the cellular telecommunications systems may be located in different regions and/or countries and may or may not overlap in the same geographical regions. However, cellular telecommunications systems operable with non-compatible air interfaces are currently being deployed in the same geographical regions. The second cellular telecommunications system 12 has an air interface (not shown) which is not compatible with that of the first cellular telecommunications system 10. The second cellular telecommunications systems includes two nodes 14 and 16 which in this embodiment represent MSCs 14 and 16, and one node 15, which represents another HLR 15. It should be understood that in both cellular telecommunications systems several nodes representing additional HLRs MSCs and other communications devices could be present in both telecommunications systems and that for the purpose of illustration the number of nodes has been limited to those shown.

MSCs 14 and 16 are interconnected by suitable signaling link means such as signaling link 28. Signaling link means 24 and 26 are provided to the HLR 20 respectively from nodes or MSCs 16 and 14. Alternatively, the MSCs 14 and 16 could be configured to communicate through a gateway signaling transfer point (STP) 31 in that cellular telecommunications system over a signaling link directly to the HLR 20. Located in FIG. 1 between the HLR 20 and MSCs 14 and 16 are translation or conversion units 30 which convert signaling standardized in association with the cellular system of the second telecommunications system 12 with that of the first telecommunications system 10 and vice a versa. These features could be incorporated in the gateway STP 31 or within each cellular exchanges, such 14, 15 and 16.

As shown in FIG. 1, the mobile terminal or subscriber 32 is a subscriber to the first cellular telecommunications system 10 and has a user profile stored in the HLR 20. When the subscriber 32 is located or wishes to communicate through the second telecommunications system 12, the subscriber is referenced as 32R. In the HLR 20 the subscriber's user profile stores the normal or common information about the subscriber and the services available to the subscriber. It is within the scope of the present invention for the HLR 20 to store user profile information relating to the two or more non-compatible cellular telecommunications systems through which the subscriber wishes to make and place calls. To achieve communications in both systems, the HLR 20, stores profile information relating to mobile identification system serial numbers (ESNs) each of which is identifiable by a respective cellular telecommunications system. The HLR 20 also has one or more mobile identification numbers (MINs) that point to the subscriber's HLR 20 and directory number subscription. The HLR 20 also preferably includes fields for storing information about the air interface protocols used in the cellular telecommunications systems.

When in its home system, i.e. the system to which the subscriber has a subscription, the mobile terminal or subscriber 32 is shown to communicate through node 18 with the HLR 20 to obtain the user profile information and permit a registration in the first cellular telecommunications system.

When the subscriber is global roaming in system 12 of FIG. 1, referenced as 32R, and should the terminal 32R attempt registration through node 14 it has a MIN associated with it which points to HLR 20. This causes node 14 to communicate over signaling link 26 with HLR 20 and obtain the user profile for the mobile 32R. HLR 20 forwards this user profile back to node 14 and allows the registration of the mobile terminal 32R at node 14. In the event terminal 32R is registered through node 14 and a call is placed to terminal 32R through node 18, node 18 interrogates HLR 20 where location of the subscriber has been updated to point to node 14. Should the call be placed at node 16 to terminal 32R, then node 16 interrogates HLR 20 via signaling link 24 and receives a temporary location directory number (TLDN) from HLR 20 that causes node 16 to set up a direct link over signaling link 28 to node 14 to set up the call to terminal 32R. In this manner, the present invention allows a subscriber to roam between non-compatible telecommunications systems. The translation device 30 is interconnected between the two telecommunications systems and acts to translate messages between the systems. That is to say, that translation device is active to convert signaling and messaging protocols between the systems.

Figure 2:
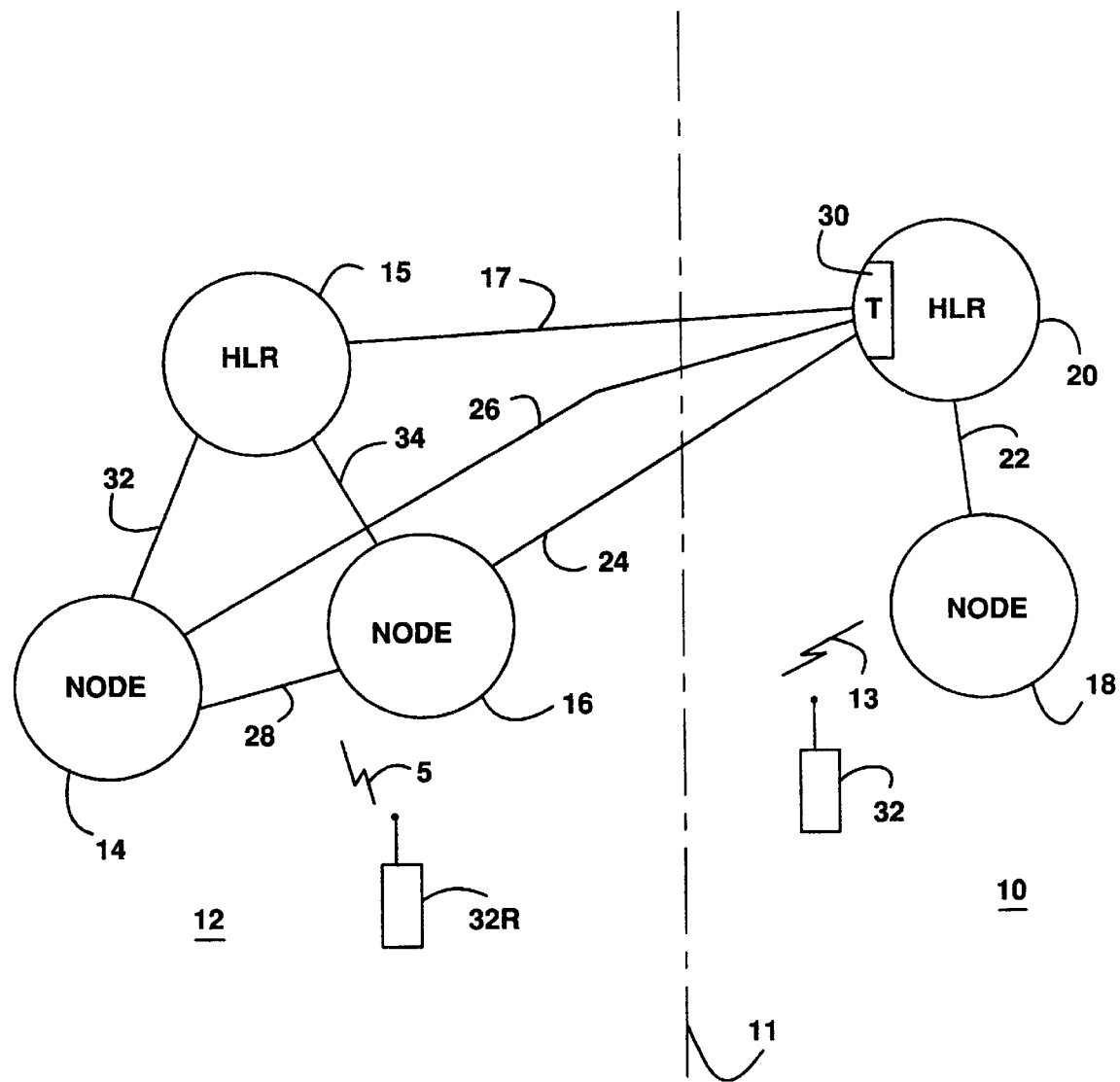
FIG. 2 is a schematic drawing showing the signaling link means between nodes in two non-compatible cellular telecommunications systems with a translation device being located in an Home Location Register of the home system for translating non-compatible messages between the systems in accordance with the present invention.

Referring to FIG. 2 there is shown a schematic drawing of two non-compatible cellular telecommunications systems 10 and 12 with translation device or devices 30 located in the HLR 20 and/or nodes 14, 15 and 16 (not shown), for interconnecting the two systems to translate non-compatible messages between the systems, in accordance with the present invention. The first cellular telecommunications system 10 includes a node 18 which comprises a mobile switching center (MSC) 18. The MSC 18 is connected through a signaling link 22 to a second node 20 which in this illustration is a home location register 20 (HLR). The HLR 20 could be located separately from the MSC 18 or could be co-located with the MSC 18 (not shown). The signaling link 22 could either could be a SS7, CC7 or X.25 configured signaling link or other appropriate link. For the purpose of illustrating separate and distinct cellular telecommunications systems, a broken line 11 is shown. It should be understood that the cellular telecommunications systems may be located in different regions and/or countries and may or may not overlap in the same geographical regions. However, cellular telecommunications systems operable with non-compatible air interfaces are currently being deployed in the same geographical regions. The second cellular telecommunications system 12 has an air interface 5 which is not compatible with the air interface 13 of the first cellular telecommunications system 10. The second cellular telecommunications system 12 includes two nodes 14 and 16 which in this embodiment represent MSCs 14 and 16. It should be understood that in both cellular telecommunications systems several nodes representing additional HLRs, MSCs and other communications devices could be present in both telecommunications systems, but that for the purpose of illustration the number of nodes has been limited to those shown.

MSCs 14 and 16 are interconnected by suitable signaling link means such as signaling link 28. Signaling link means 24 and 26 are provided to the HLR 20 respectively from MSCs 16 and 14. Alternatively, the MSCs 14 and 16 could be configured to communicate through a gateway STP (not shown) in that cellular telecommunications system over a signaling link (not shown) directly to the HLR 20.

In FIG. 2 the translation or conversion devices are located either in the HLR 20 or the cellular nodes 14, 15 and 16 (not shown), to allow direct communications between the HLR 20 and the MSC 18 of the first cellular telecommunications system 10 with the second cellular telecommunications system 12. In such an embodiment, to minimize the number of translation devices, the MSC 18 could be considered as a gateway STP, as known in the art, through which calls could be set up to the subscriber when globally roaming in the second cellular telecommunications system 12. This would permit calls to be placed and set up between systems in a manner similar to that discussed for FIG. 1.

In FIGS. 1 and 2, there is shown an HLR 15 associated with the cellular telecommunications system 12. The HLR 15 acts in the cellular telecommunications system 12 in the same manner that HLR 20 normally services cellular system 10. HLR 15 is connected through signaling links 32 and 34 to nodes 14 and 16. Further, there is shown an interconnection link 17 interconnecting HLR 15 of cellular system 12 with HLR 20 of cellular system 10. The HLR 15 to HLR 20 signaling eliminates the need for each node in one system to be programmed with the destination point code or global exchange address of the nodes in the other system. Only the HLRs 15 and 20 in each system need to know the addresses of the HLRs in the other systems Voice trunk calls between the two systems would not be affected and would thus still be required.

Figure 3:
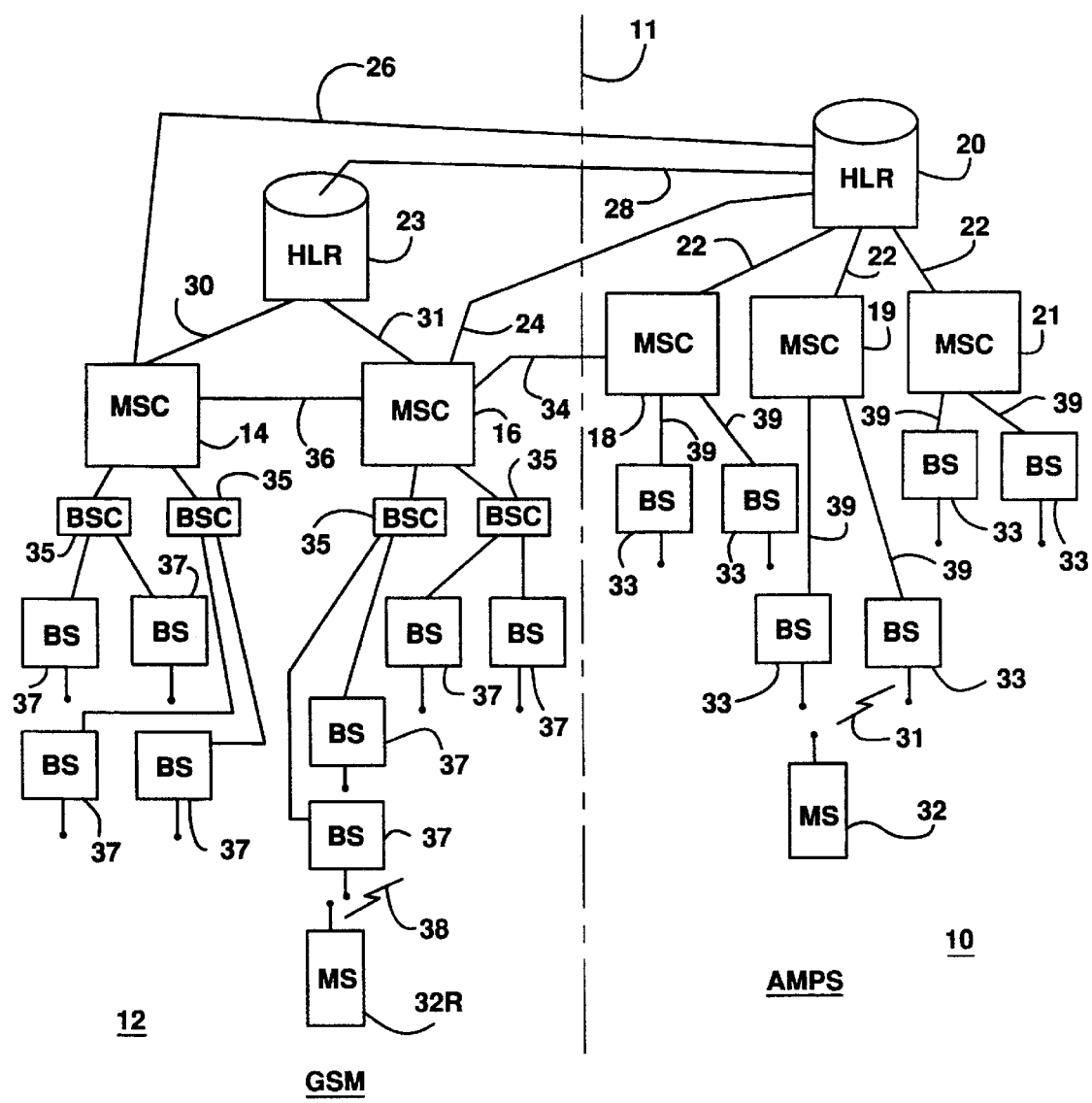
FIG. 3 is a block diagram illustrating non-compatible cellular telecommunications systems of the present invention where the nodes in the systems are represented by Mobile Switching Centers (MSCs)

Referring now to FIG. 3 there is shown two non-compatible cellular systems such as Advanced Mobile Phone System (AMPS) 10 and Global System Mobile Communications (GSM) 12. Between cellular telecommunications systems 10 and 12 is illustrated a broken line 11 to emphasize the distinction in the compatibility of the two systems. It should be understood that the systems 10 and 12 may be located in mutually exclusively geographical regions or alternatively may provide cellular telephone coverage to the same or overlapping geographical regions by similar or different service providers.

Referring to the cellular system 10, this system has nodes 18, 19, 20 and 21 where nodes 18, 19 and 21 represent MSCs. The node 20 represents a home location register HLR for the cellular telecommunications system 10 of a particular service provider. In the HLR 20, service profiles associated with each of the mobile subscribers having cellular telecommunications contracts with the operator of system 10 are provided. Connected to each of the MSCs 18, 19 and 21 are cellular base stations 33. These base stations 33 are connected to the respective MSC by land line signaling trunks 39. It should be understood that each MSC, 18, 19 and 21, is capable of operating many base stations 33 and considerably more than those shown in the drawing. Within the cellular system 10, each base station 33 is located within a cell (not shown) over which the base station 33 is able to communicate with mobile terminals 32 located within the cell coverage area of the base station 33. Although not shown in this drawing, the base stations are typically positioned at or near the center of each cell. However, depending on the geography and other factors, the base stations may instead be located at or near the periphery of or otherwise away from the centers of each cell. In such instances, the base stations may broadcast and communicate with mobile terminals 32 located within the cells using directional rather than omni-directional antennas. Each one of the base stations 33 includes at least one transmitter, receiver and base station controller connected to the antenna, which is a configuration well known in the art.

The telecommunications system 12, while configured in a similar manner to system 10, has MSCs 14 and 16 connected through signaling links 30 and 31 to a corresponding HLR 23. These MSCs 14 and 16 are connected through base station controllers 35 to respective base stations 37. The primary difference in this system is the use of base station controllers to provide some of the logical functions associated with the switching of base stations, or groups of base stations, that normally would have been provided in the MSCs of the cellular telecommunications system 10. Further, the cellular telecommunications system 12 provides signaling of its messages using different protocols for its messages within the system and over the air interface 38 between the base stations 37 and the mobile terminal 32R, than cellular telecommunications system 10, over its air interface 31, between the base stations 33 and the mobile terminals 32. Moreover, the mapping strategy of how cells cover the geographical regions in each system could be different.

In accordance with the present invention, there is provided signaling link means 24, 26 and 28 between the MSCs 14 and 16 and HLR 23, respectively of cellular telecommunications system 12, and the HLR 20, and MSCs 18, 19, and 21, of cellular telecommunications system 10. As stated herein before, these signaling link means 24, 26 and 28 may comprise SS7, CC7 or X.25 protocol signaling link systems.

Figure 4:
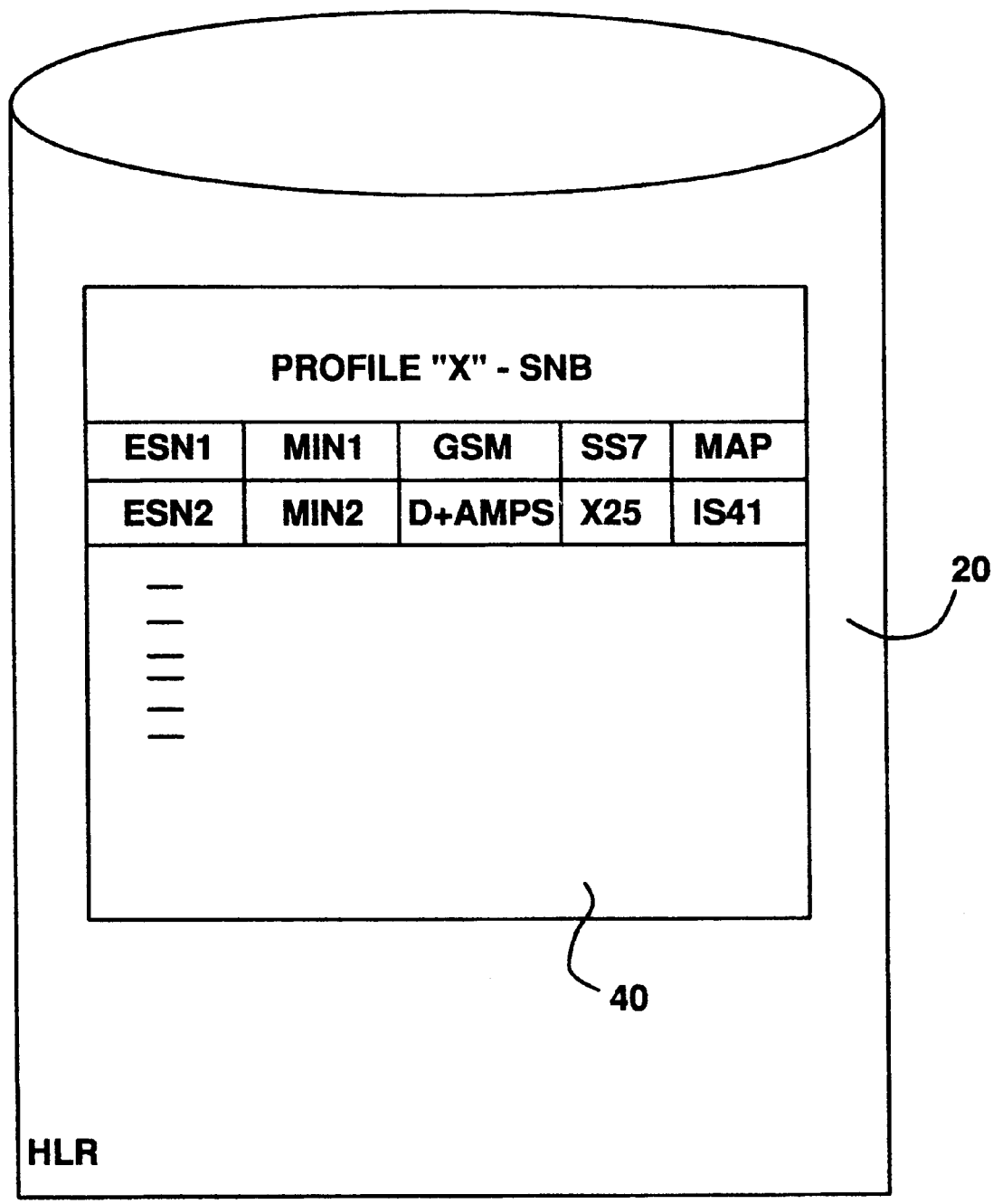
FIG. 4 is a diagram illustrating the user profile of a subscriber in his/her HLR located in a subscribing cellular telecommunications system that is able to permit service in both the subscribed system and a non-compatible cellular telecommunications system.

Referring both to FIGS. 3 and 4, there is shown a typical user profile 40 which would be stored in the HLR 20 of the AMPS system 10 for a particular subscriber X having a SNB associated with his mobile terminals. In the profile there would be provided two fields or rows of information associated with each of the ESN1 and ESN2 numbers. Associated with ESN1 is also a mobile identification number (MIN) which typically points to the user in HLR 20. Also associated with field or row ESN1 is information relating to the type of air interface or cellular telecommunications system in which this ESN1 operates. In this instance, ESN1 represents a GSM system, and communications between nodes in that GSM system are provided by a particular messaging standard or a particular link which is shown in this embodiment as X.25 and MAP for illustration purposes. The other ESN is in the row for ESN2 which represents the same or different MIN where the first few digits in the MIN identify the HLR 20. This ESN2 is associated with the AMPS system and possibly with messaging between those being used over an SS7 and IS-41 link. Some other information could also be stored in the user profile which is not shown in the drawing, but which would be related to the fact that the individual may have other services associated with his subscription, such as a message center, message waiting indicator, call waiting, call transfer and or other features.

Figure 5:
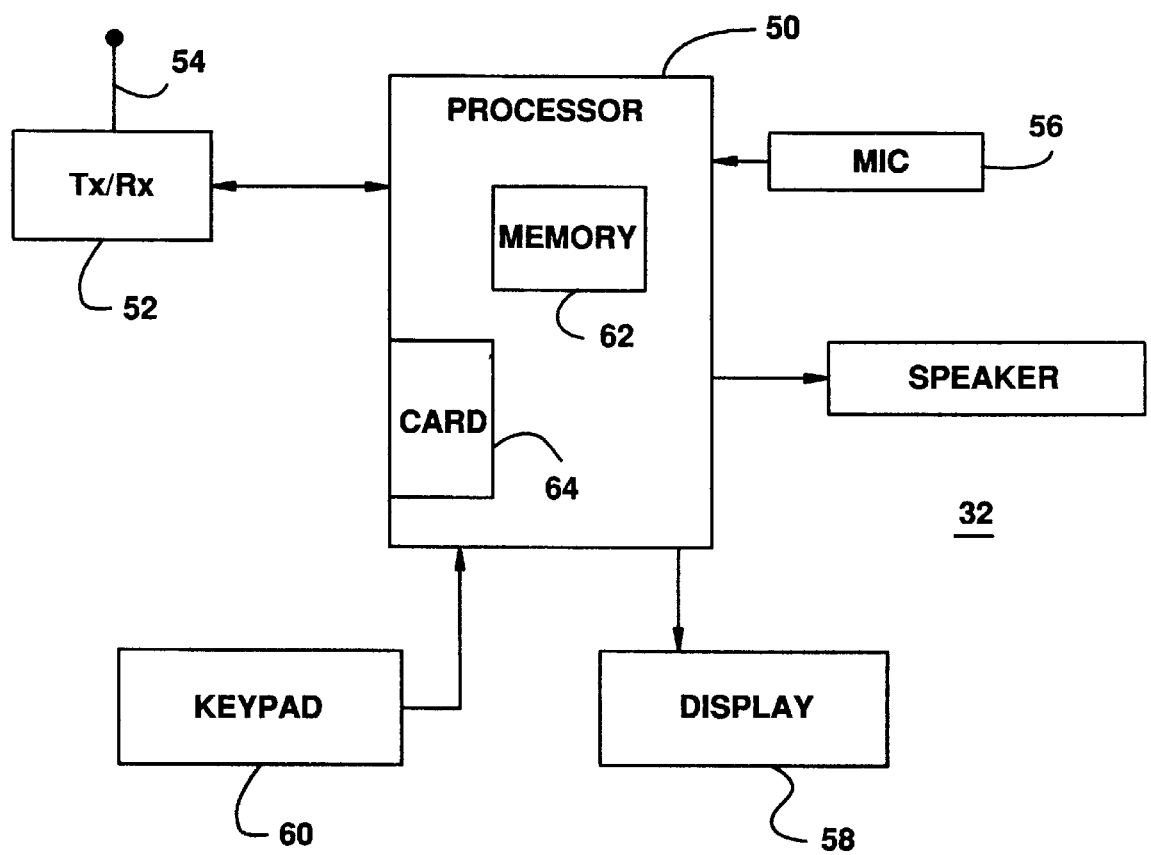
FIG. 5 is a simplified block diagram of a mobile terminal operable in the global roaming system of the present invention.

Referring now to FIG. 5, there is shown a block diagram of a mobile terminal 32 (or 32R). The terminal 32 is shown to include a processor 50 connected to a transceiver 52. An antenna 54 is connected to the transceiver 52 for transmitting and receiving communications such as digital communications over a cellular telephone network. The mobile terminal 32 further includes a microphone 56 connected to the processor 50 for facilitating telephone voice communications. A display panel 58 and a keypad 60 are also included in the mobile terminal 32 and connected to the processor 50. The mobile processor 50 further includes memory 62 for storing system parameters associated with the mobile terminal 32. This memory could include one or more ESN and MIN adapted to one or to the other or to both non-compatible cellular telecommunications systems where the user could selectively activate which ESN and MIN would be transmitted by the mobile terminal when it was activated or turned on. It should be understood that more than two non-compatible cellular systems can be defined in the HLR user profile. This causes the mobile terminal to operate over the air interface through its antenna 54 and transceiver 52 in accordance with the air interface protocols required for the particular selected cellular telecommunications system. However, it is within the scope of the present invention to provide more than one mobile terminal such as a first terminal programmed with one ESN and one MIN to communicate in accordance with the air interface protocols of a first cellular telecommunications system This would then require a second mobile terminal able to operate with the air interface protocol of a second non-compatible cellular telecommunications system In this instance, the second mobile terminal would be provided with a different ESN which would be identifiable and recognizable by that second cellular telecommunications system The second mobile terminal would also have a related or same MIN to that of the first terminal identifying its HLR.

Referring again to FIG. 5, in this embodiment of the mobile terminal, there is further included a port for a card or a smart card 64 which can be inserted into the terminal 32 for the purpose of providing the mobile terminal 32 with the ESN and MIN of the respective telecommunications system in which this mobile terminal is to operate. Further, the card could also identify the required programming logic for the mobile terminal 32 to communicate with the corresponding systems protocols, such as for example the air interface, of this particular cellular telecommunications system.

Referring now to FIGS. 3, 4 and 5, the method of allowing a subscriber to globally roam between cellular telecommunications system 10 and 12 is described. It should be understood, however, that roaming within compatible cellular telecommunications systems across geographical regions where service in the compatible cellular telecommunications system is provided by different service providers will still be possible in accordance with well known practices. It is assumed that the mobile terminal 32 is subscribed in the cellular telecommunications system 10 and has its user profile stored in HLR 20, where the user profile is similar to that shown in FIG. 4. When this mobile terminal 32 registers in its cellular telecommunications system through one of the MSCs 18, 19 or 21, and a corresponding base station 33, the mobile terminal 32 will be programmed with its smart card 64 to provide ESN2 and MIN2 such that the mobile terminal 32 is allowed to register in this system.

In the event the mobile terminal 32 is roaming in system 12 as represented by mobile terminal 32R, then the card used with this mobile terminal 32 will provide it for being able to operate in this cellular telecommunications systems air interface standards. Further the card 64 will carry or support ESN1 and the associated MIN1. When the mobile terminal 32 registers through a base station 37, a base station controller 35 and a corresponding node or MSC 14 or 16 within the cellular telecommunications system 12, the ESN1 and MIN1 are transmitted to the MSC. The MSC checks with its VLR (not shown) and/or HLR 23 over links 30 or 31 and determines that this mobile terminal 32R is not a true subscriber to the cellular telecommunications system 12. However, the MSCs 14 and 16 recognize the MIN and can identify that this MIN is associated with HLR 20, which is typically done through a look up table or number analysis, which is commonly known in the art, and then establishes a communication signaling link over either link 24 or 26 depending on which MSC 14 or 16 sends a Registration Request to the HLR 20. Upon receipt of the establishment of this Registration Request, the HLR 20 checks the ESN and MIN transmitted and determines that the user does have roaming privileges in this other non-compatible telecommunications system 12, and indicates which type of system in which the user is located and the signaling protocol required. The HLR 20 then does a location update so as it knows the location of the mobile terminal 32R. The HLR 20 also downloads the user profile associated with that subscriber having converted this through the translation signaling devices 30 (as shown in FIGS. 1 and 2), such that the entire user profile, or that portion of the profile supported by the remote, is downloaded to the VLR (not shown) contained within that node. At this time, the mobile terminal 32R is registered in the telecommunications system 12. Alternatively, the registration and deregistration in HLR 20 could be done via HLR 23 over link 28.

Assuming that the mobile subscriber 32R is registered through MSC 14 in the cellular telecommunications system 12, then if a call is placed to this person's SNB telephone number through MSC 16, then MSC 16 interrogates over a signaling link as shown in FIG. 3 at 24 to the HLR 20, which in turn requests a TLDN over signaling link 26 to MSC 14. HLR 20 returns this TLDN to MSC 16 so that the mobile terminal 32R may be contacted through node 14. MSC 16 establishes a signaling link at 36 to node 14 whereby the TLDN is provided to identify the person receiving the telephone call so that the MSC 14 can connect this call. In the event a call is placed to the mobile terminal 32R through a subscriber calling from the AMPS system 10 or a PSTN system (not shown) connected to one or several of the MSCs in the AMPS system 10. The MSC in the AMPS system 10 obtains from the HLR 20 the latest location of the mobile terminal 32R at MSC 14. This allows a direct link to be provided such as at 34 in broken line from the MSC 18 directly to the node 14. The node 14 then sets-up the call with mobile terminal 32R.

By providing different categories in the profile of the user in its home locating register for each ESN and MIN pair, the mobile terminal is able to obtain a profile for use in non-compatible systems from its HLR, and the HLR can be updated with the location of the mobile terminal in the non-compatible cellular telecommunications system. Although a preferred embodiment of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A global roaming system comprising first and second cellular telecommunications systems having non-compatible air interfaces allowing a subscriber having a subscription with one directory number in the first cellular telecommunications system to roam in the second cellular telecommunications system where roaming by the subscriber in the second cellular telecommunications system is validated by the first cellular telecommunications system, comprising:

a cellular subscriber terminal assigned to said subscriber and adapted to operate in the first and second cellular telecommunications systems with the corresponding non-compatible air interfaces, said terminal operable to transmit over the non-compatible air interfaces a first pair of numbers comprising a first mobile identification number (MIN) and a mobile serial system number (ESN) when operating in the first cellular telecommunications system, and to transmit a second pair of numbers comprising a second MIN and the ESN when operating in the second cellular telecommunications system;

the first cellular telecommunications system including a home location register (HLR) that stores a service profile for said subscriber, said service profile identifying the cellular subscriber terminal by said one directory number, and associating the first pair of numbers with the first cellular telecommunications system and the second pair of numbers with the second cellular telecommunications system, said HLR including:

means for determining whether the subscriber terminal is operating in the first or second cellular telecommunications system by determining whether the first or second pair of numbers is received when the terminal registers; and means for authenticating that the subscriber is permitted to access the cellular telecommunications system in which registration is requested;

signaling link means interconnecting the first and second cellular telecommunications systems with the HLR; and first and second registration means corresponding to each of the first and second telecommunications systems responsive to a registration request from the subscriber terminal when located in either system to forward over the signaling link means to said HLR said number pair to authenticate that the subscriber is permitted to access the cellular telecommunications system in which registration is requested.

2. The global roaming system of claim 1 wherein the signaling link means include signal conversion means between the second cellular telecommunications system and the HLR to translate non-compatible messages between the HLR and the second telecommunications system.

3. The global roaming system of claim 1 wherein the HLR further includes a field identifying the associated air interface protocol associated with the MIN/ESN number pair.

4. The global roaming system of claim 1 wherein the HLR stores an update location for the mobile terminal when it is roaming in the second cellular telecommunications system.

5. The global roaming system of claim 1 wherein the HLR includes signal conversion means connected to the signaling link means for the second cellular telecommunications system to translate non-compatible messages between the HLR and the second telecommunications system.

6. The global roaming system of claim 1 wherein the cellular subscriber terminal includes a port for receiving a smart card adapted to provide communications in accordance with the air interface protocols for one or more of the cellular telecommunications systems and provide the appropriate ESN and MIN number pair.

7. A global roaming system allowing a subscriber to roam between first and second cellular telecommunications systems having non-compatible air interfaces where the subscriber has a subscription in the first cellular telecommunications system, and at least one mobile terminal adapted to operate with each of the non-compatible air interfaces, comprising:

a home location register (HLR) associated with the first cellular telecommunications system that stores a service profile for said subscriber, said service profile including fields for storing a first pair of numbers comprising a first mobile identification number (MIN) and a mobile serial system number (ESN) associated and compatible with the first cellular telecommunications systems, and a second pair of numbers comprising a second MIN and the ESN associated and compatible with the second cellular telecommunications system, said BLR including:

means for determining whether the subscriber is operating in the first or second cellular telecommunications system by determining whether the first or second pair of numbers is received when the terminal registers; and means for authenticating that the subscriber is permitted to access the cellular telecommunications system in which registration is requested;

signaling link means interconnecting the first and second cellular telecommunications systems with the HLR; and registration means for each of the first and second telecommunications systems responsive to a registration request from the subscriber to forward over the signaling link means the MIN and ESN pairs corresponding to the cellular telecommunications system in which registration is requested to the HLR associated with the MIN to authenticate that the subscriber is permitted to access the cellular telecommunications system in which registration is requested.

8. The global roaming system of claim 7 wherein the subscriber has one directory number (SNB) associated with the first cellular telecommunications system which is globally accessible.

9. The global roaming system of claim 7 wherein the signaling link means include signal conversion means between the second cellular telecommunications system and the HLR to translate non-compatible messages between the HLR and the second telecommunications system.

10. The global roaming system of claim 7 wherein the HLR further includes a field identifying the associated air interface protocol associated with the MIN/ESN number pair.

11. The global roaming system of claim 7 wherein the HLR stores an update a location for the one mobile terminal when it is roaming in the second cellular telecommunications system.

12. The global roaming system of claim 7 wherein the HLR includes signal conversion means connected to the signaling link means for the second cellular telecommunications system to translate non-compatible messages between the HLR and the second telecommunications system.

13. A method for global roaming allowing a subscriber to roam between first and second cellular telecommunications systems having non-compatible air interfaces where the subscriber has a subscription in the first cellular telecommunications system and at least one mobile terminal adapted to operate with the non-compatible air interfaces, the method comprising the steps of:

storing in a home location register (HLR) associated with the first cellular telecommunications system a service profile for said subscriber that includes fields for a first number pair comprising a first mobile identification number (MIN) and a mobile serial system number (ESN) which is recognizable by the first cellular telecommunications system, and a second number pair comprising a second MIN and the ESN which is recognizable by the second cellular telecommunications system;

interconnecting the first and second cellular telecommunications systems through signaling links with the HLR;

registering the mobile terminal in the first telecommunications system by transmitting directly to the HLR associated with the first MIN number, a registration request from the mobile terminal over the signaling link means and including the first number pair recognizable by the first telecommunications system;

registering the mobile terminal in the second telecommunications system by transmitting directly to the HLR associated with the second MIN number, a registration request from the mobile terminal over the signaling link means and including the second number pair recognizable by the second telecommunications system; and authenticating in the HLR that the mobile terminal is permitted to access service in the telecommunications system in which registration is requested.

14. The global roaming method of claim 13 further including the step of translating non-compatible messages transmitted between the second cellular telecommunications system and the HLR.

15. The global roaming method of claim 13 wherein the HLR further includes a field identifying the associated air interface protocol associated with the ESN.

16. The global roaming method of claim 13 further including the step of addressing the one mobile terminal with one directory number (SNB) associated with the first cellular telecommunications system.

17. The global roaming method of claim 13 wherein the mobile terminal is programmed with more than one MIN number that identifies the same directory number (SNB) in the HLR.

18. The global roaming method of claim 13 further including the step of the HLR storing an updated location for the one mobile terminal when it is roaming in the second cellular telecommunications system.

* * * * *